Patented Jan. 5, 1943

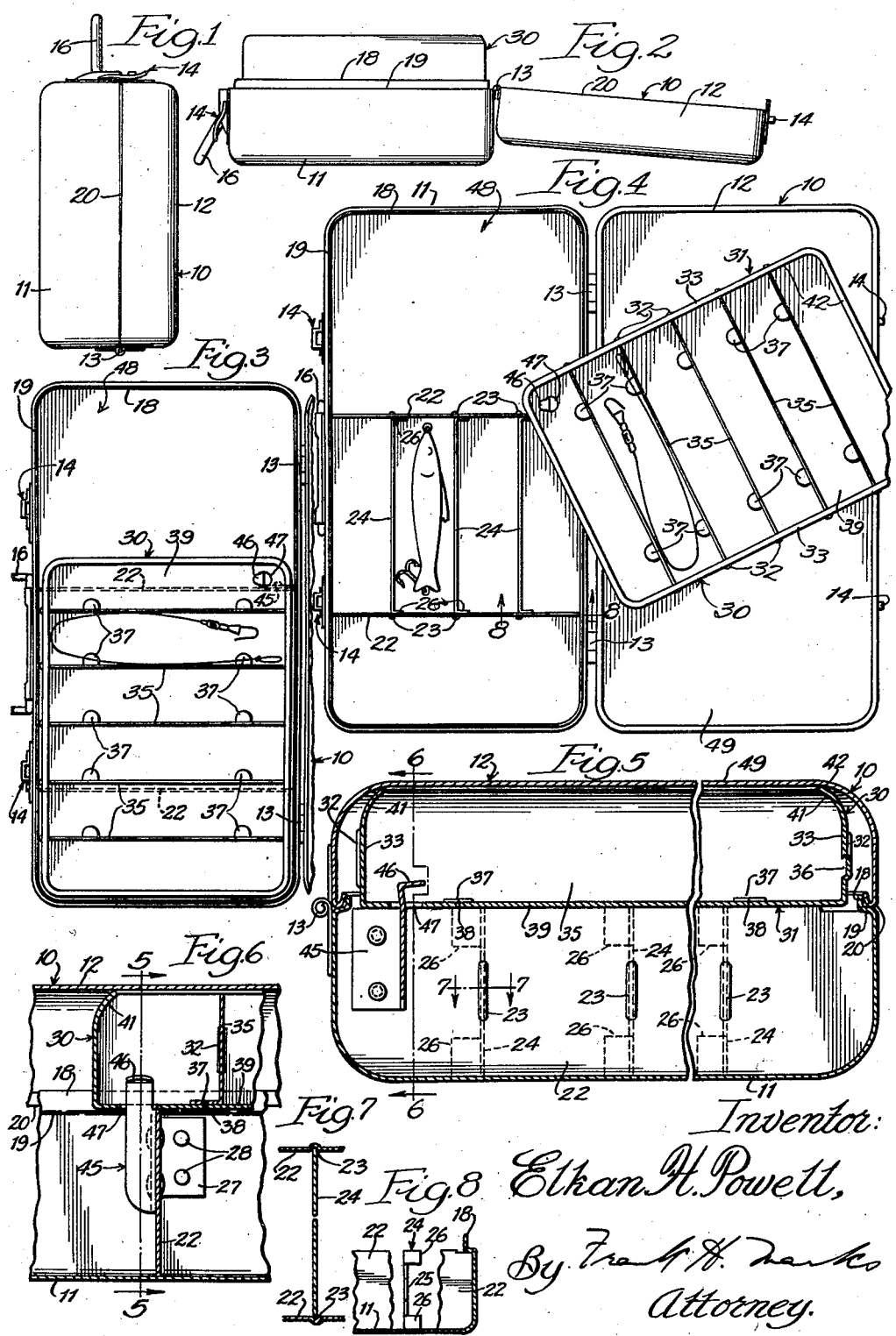

2,307,073

UNITED STATES PATENT OFFICE 2,307,073

FISHING TACKLE BOX

Elkan H. Powell, Winnetka, Ill., assignor to Sears, Roebuck and Co., Chicago, Ill., a corporation of New York Application June 13, 1938, Serial No. 213,467

3 Claims. (Cl. 206—16)

This invention relates to utility containers and more particularly to fishing tackle boxes.

It is an object of the invention to provide a box of this character which is compact and affords adequate space for the various implements and equipment needed by the user.

It is another object to provide a container of the character referred to including a tray which may be readily adjusted or removed to afford access to other parts of the box.

A further object resides in the provision of a box of the character referred to affording improved compartment construction.

It is also an object to provide a tackle or the like box affording a tray so anchored that it may be supported in any desired position and entirely removed, merely in response to manipulation of the tray.

Further objects and advantages of the invention will appear as the description proceeds.

The invention will be understood upon reference to the accompanying drawing, in which:

Fig. 1 is an end elevation of a closed box ready to be carried, constructed in accordance with one form of the invention;

Fig. 2 is an end elevation of the box opened and ready for use;

Fig. 3 is a fragmentary plan view of the structure shown in Fig. 2;

Fig. 4 is a view similar to Fig. 3 but with the tray shifted;

Fig. 5 is an enlarged fragmentary sectional view through the box, taken as indicated by the line 5—5 in Fig. 6;

Fig. 6 is a fragmentary sectional view taken as indicated by the line 6—6 in Fig. 5;

Fig. 7 is a fragmentary sectional view taken as indicated by the line 7—7 in Fig. 5;

Fig. 8 is a fragmentary sectional view taken as indicated by the line 8—8 in Fig. 4;

Fig. 9 is a fragmentary sectional view taken as indicated by the line 9—9 in Fig. 5.

Referring now more particularly to the drawing, which illustrates a preferred embodiment of my invention, there is shown a box casing 10 having a bottom section 11 and a top or lid section 12 hinged together at 13 and adapted to be closed by any suitable means, such as the spring latch means 14, a handle 16 being suitably mounted, as on the section 11, for enabling the box and contents to be carried.

The section 11 preferably has a skirt 18 providing a shoulder 19 on which the free edge 20 of the lid 12 is adapted to rest when closed. The lid 12 is preferably folded so that the edge 20 may be smooth and will not injure the hands or clothing.

Formed in a pair of plates 22 preferably substantially parallel to each other are opposed depressions 23 arranged in sets, and a partition 24 is formed with short tongues 25 fitted into each pair of opposed depressions. In the illustrated embodiment of the invention, three such partitions are shown, but it is apparent that the number may be varied without departing from the principles of the invention. Each partition, adjacent each tongue thereof, is preferably bent to provide one or more ears 26 adapted to lie against the adjacent plates 22, and when the plates and partitions are assembled as shown, said ears are united as by spot-welding or the like with said plates. As the partitions are provided only for the purpose of affording cells for receiving bait and other fishing paraphernalia, said partitions may be of very thin gauge metal or other material. The plates 22 may be provided with ears 27 and riveted as at 28 or otherwise suitably joined to the opposed walls of the section 11, preferably after being assembled with the partitions, but before if desired, in which event the partitions may be resiliently bowed so as to be sprung into place preparatory to the securement of the ears 26. With this construction it is apparent that the parts may be speedily assembled and joined to one another and to the box at considerable saving of time and expense over boxes of this character heretofore known.

The box also embraces a removable tray indicated generally at 30. This tray comprises a shell 31 having sets of depressions 32 in opposed walls 33 thereof. Partitions 35 are provided with tongues 36 adapted to be slipped into the opposed recesses, and to this end the partitions may be made of sufficiently thin gauge metal or other material to enable them to be resiliently bowed for the purpose of inserting the tongues into the recesses, each partition, upon being released, assuming its normal condition substantially as shown. Projecting from the lower edge of each partition is one or more ears 37 which are preferably spot-welded as at 38 or otherwise suitably secured to the bottom 39 of the lid. Each partition may be somewhat reduced at the upper end portions thereof as at 41, and the rim 42 of the shell is bent inwardly, the rim portions adjacent the partitions being formed to engage the end portions 41. The inwardly bent rim is conducive to strength and serves to prevent material contained in the shell or tray from falling out in the event the shell is tipped slightly.

Suitably supported, preferably within the casing 11, as at an end of a plate 22, is a bracket 45 having an angularly offset finger or ear 46. The tray 30 has an opening 47 preferably in a corner thereof and preferably of a diameter greater than the width of said ear, so that said opening may pass readily over, about and under said ear, which serves to detachably anchor the tray. The ear and hole are so arranged that when the tray is slipped over the ear the tray rests on and covers the entire compartment mounted in the section 11, the bottom of the tray having such engagement with the plates 22 as to practically close the compartment. The arrangement of the tray when so mounted on the compartment is such as to leave ample free space at 48 for such other articles as may be desired. When the tray is so positioned, it projects upwardly from the section 11 to such an extent that when the lid is closed the rim 42 of the tray is in substantial engagement with the main wall 49 of the lid, so that the latter closes the tray when the box is closed and thus prevents disarrangement of the articles stored in the several tray chambers when the box is carried or otherwise moved about.

The ear 46 is so disposed that the tray may be raised without disengagement from the ear and yet to a height which will enable the tray to clear the skirt 18 and in fact all obstructions so that the tray may be swung completely around or to any extent desired and allowed to rest in the position selected, the tray being then supported by one or both of the rims of the shells 11 and 12. The tray may be completely removed simply by slipping it up and off the ear.

The latch means, handle and hinge means may be of any conventional hardware, and the box casing, fixed compartment and tray may be formed of sheet metal of thin gauge which will stand up in service and yet which will afford a sturdy construction of light weight and easy portability.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A box of the class described comprising a shell having bottom and side walls, means providing a plurality of chambers therein, a tray formed to cover and be supported by said means, said shell being of greater extent than the first-mentioned means and said tray so that when said tray is disposed over said first-mentioned means, there remains an accessible storage space in said shell, means for preventing shift of said tray when said tray covers the first-mentioned means, said tray having an inwardly overhanging rim, and a lid connected to said shell and formed to be in substantial contact with said rim when said lid is closed.

2. A box of the class described comprising a shell member, a tray member mounted so that its bottom rests on and over said shell member, a bracket projecting from one of said members and having a finger, the other member having a hole of such size and shape and so arranged as to admit said finger therethrough in a direction substantially normal to said bottom and allow said tray member to have unlimited rotation substantially parallel to said bottom, said finger having a portion extending laterally and out of register with said hole in most positions of said tray member, tending to prevent accidental removal of said tray member.

3. A box of the class described comprising a shell and a lid therefor, a tray adapted to rest in and below the top of said shell and to be enclosed in said box when said lid is closed, said shell and lid having tray-supporting portions lying substantially in the same plane when said lid is open, the bottom of said tray being adapted to rest on said portions when the tray is lifted out of said shell, and a pivotal connection between said shell and said tray enabling said tray, when the box is open and said tray is lifted out of said shell, to be turned about its pivotal connection to enable the bottom of said tray to occupy any desired position substantially in the same plane, said pivotal connection comprising telescopically connected parts having telescopic movement when said tray is raised and lowered.

ELKAN H. POWELL.